United States Patent [19]
Rosen

[11] 3,791,473
[45] Feb. 12, 1974

[54] HYBRID POWER TRAIN
[75] Inventor: Charles L. Rosen, Teaneck, N.J.
[73] Assignee: Petro-Electric Motors Ltd., New York, N.Y.
[22] Filed: Sept. 21, 1972
[21] Appl. No.: 290,784

[52] U.S. Cl. ................................ 180/65 A, 290/16
[51] Int. Cl. ............................................. B60k 1/00
[58] Field of Search.... 180/65 A, 44 M, 70; 290/14, 290/16

[56] References Cited
UNITED STATES PATENTS

| | | | |
|---|---|---|---|
| 1,664,562 | 4/1928 | Jensen | 180/65 A |
| 3,566,717 | 3/1971 | Berman et al. | 180/65 A |
| 3,620,323 | 11/1971 | Maeda | 180/65 A |
| 3,650,345 | 3/1972 | Yardney | 180/65 A |
| 3,623,568 | 11/1971 | Mori | 180/15 |

Primary Examiner—Allen N. Knowles
Attorney, Agent, or Firm—Gottlieb, Rackman, Reisman & Kirsch

[57] ABSTRACT

The disclosed hybrid power train for a self-propelled vehicle is designed to reduce the emission of atmospheric pollutants. The chemically fueled prime mover and the secondary-battery powered electric dynamotor are joined together and joined to the output shaft by fixed ratio rotating linkage. The prime mover is operated as a quasi-constant -torque device, with its torque able to be varied in response to the state of charge of the battery or to operator torque demands in excess of certain predetermined amounts. The instantaneous torque output of the combined combustion engine/electric motor power train is controlled by a mechanical accelerator control which causes the dynamotor to either add to or subtract from the torque produced by the prime mover. When added torque is required by the vehicle, the dynamotor takes energy from the storage battery. When less torque is required, the extra energy produced by the prime mover is fed by the dynamotor into the storage battery. The low pollution qualities of this power train are realized, in part, by the uncoupling of the prime mover throttle from the rapid variations of the accelerator control typical of urban driving.

9 Claims, 2 Drawing Figures

HYBRID POWER TRAIN

BACKGROUND OF THE INVENTION

1. Field of the Invention

Low pollution power trains for self-propelled vehicles.

2. Brief Description of the Prior Art

In the search for low pollution power trains, it was soon recognized that a reduction in the level of atmospheric pollutants, and more efficient combustion from a chemically fueled vehicle, could be realized by limiting the rate of variation of the power demanded from the chemically fueled engine. One approach which has been taken in this regard is the utilization of a combined power source consisting of a chemically fueled combustion engine and an electric motor, in a so-called hybrid power plant. An electric motor, drawing its energy from a storage battery, is included in the power train to provide the instantaneous peak power requirements. During periods of decreased demand, the excess engine power is used to recharge the battery.

One example of this type of reasoning is the use of the engine as a constant power output device. In this useage, since the engine does not have to change it power output rapidly, the engine can be optimized to operate in a manner that leads to low pollution by controlling such operating parameters as air-fuel mixture, timing of the ignition, and the addition of inert diluents to the combustion chamber. A recent effort in this direction is contained in U.S. Pat. No. 3,566,717 issued on Mar. 2, 1971 to B. Berman et al. This power train utilizes a planetary gear linkage between a constant power output engine and the vehicle's drive shaft and two subsidiary electrical devices, a generator, and a motor-generator, the combination being controlled by sophisticated feedback control circuitry. This complexity is due in part to the fact that, in the Berman power train, the engine is turning at constant speed while the vehicle's drive mechanism must be able to vary the vehicle speed.

The Berman power train also incorporates a "stored energy" sensor which monitors the charge state of the battery and causes an adjustment in the engine's output power sufficient to maintain the charge level of the battery. Many methods of accomplishing this throttle control to vary the engine's output power are known. One is contained in the early disclosure of a hybrid power train (U.S. Pat. No. 913,846, issued to H. Pieper — Mar. 2, 1909). In the Pieper hybrid power train, which joins the electric motor and combustion engine by means of a fixed ratio rotating linkage, the engine throttle is responsive to changes in the accelerator pedal at all settings of the accelerator pedal. Thus, any rapid change in the setting of the accelerator pedal by the driver produces a rapid change in the combustion chamber inlet pressure resulting in less than optimum combustion. In a vehicle designed for low pollution operation, especially in stop-and-go urban driving, it is important to minimize the number of such rapid changes in engine operating conditions. The Berman device and other suggested power trains suffer from a certain complexity of realization. In any such devices destined for a mass market, simplicity and economy are much sought after.

SUMMARY OF THE INVENTION

A simple hybrid power train designed to produce low levels of atmospheric pollutants has been developed. It utilizes a heat engine, operating in a quasi-constant-torque mode, as a prime mover in conjunction with a secondary electromechanical system. The secondary system includes an accumulator such as a storage battery, and an electromechanical device capable of converting back and forth between electrical and mechanical energy. Peak torque loads are supplied by the electromechanical system using energy stored in the battery. During time of less load demand than is supplied by the heat engine, the electromechanical device recharges the battery.

The simplicity of the system derives primarily from the fact that the heat engine, the electromechanical device and the output drive shaft are connected by fixed ratio linkages. This includes, as the simplest realization, a colinear shaft system. The low pollutant capability of this system results from the quasi-constant-torque operation of the heat engine. In quasi-constant-torque operation, as herein described, the heat engine's fuel control (e.g., the throttle of an internal combustion engine) is not coupled to the control that signals the instantaneous torque demand of the vehicle over the torque range required by most urban driving. This eliminates the rapid variations of engine inlet pressure and consequent undesirable changes in fuel-air mixture distribution, which is a source of atmospheric pollutants produced by engine propelled vehicles in stop-and-go driving. The utilization of a quasi-constant throttle settings also permits simple fuel-air metering systems (e.g., carburetor) to operate without unwanted changes in fuel-air mixture caused by rapid changes in throttle settings. In addition, the use of quasi-constant-torque conditions produces an exhaust volume that is directly related to engine speed, which enhances the operation of exhaust treatment systems. The principle control over the heat engine is via a sensor which monitors the average power demand of the vehicle, for instance, by monitoring charge state of the storage battery.

DETAILED DESCRIPTION OF INVENTION

Prime Mover Operation

The prime mover in the hybrid power train of the instant invention is a heat engine powered by a chemical fuel. One particular engine type, which is of great commercial importance is the internal combustion engine powered by a fossil hydrocarbon fuel (e.g., gasoline). The two major variants of this type of engine are the piston engine and the rotary engine. Further discussion will be limited to these exemplary devices, although the general considerations presented can readily be translated to considerations of other types of heat engines known in the art, such as the gas turbine engine, the diesel engine, the steam engine, the Stirling engine, or others.

The throttle valve of an internal combustion engine regulates the volume of vaporized fuel-air mixture admitted into the combustion chamber. In controlling the fuel charge, this valve regulates the force applied to the crank shaft. Thus, an engine operating at a constant throttle setting, to a first approximation, is operating at constant torque, independent of engine speed. The power output of the engine is the product of the torque applied to the crank shaft, and the engine speed (the angular velocity of the crank shaft). At any single engine speed the fuel-air mixtures, the spark firing angle and other internal parameters of the engine can be adjusted to optimize the combustion efficiency of the engine and minimize the emission of atmospheric pollutants. This optimization at one engine speed is the basis of operation of the constant power hybrid power train mentioned previously. Since the engine speed must remain constant in constant energy operation, while the speed of the vehicle varies, the required linkages and control systems are relatively complex.

Figure 2:
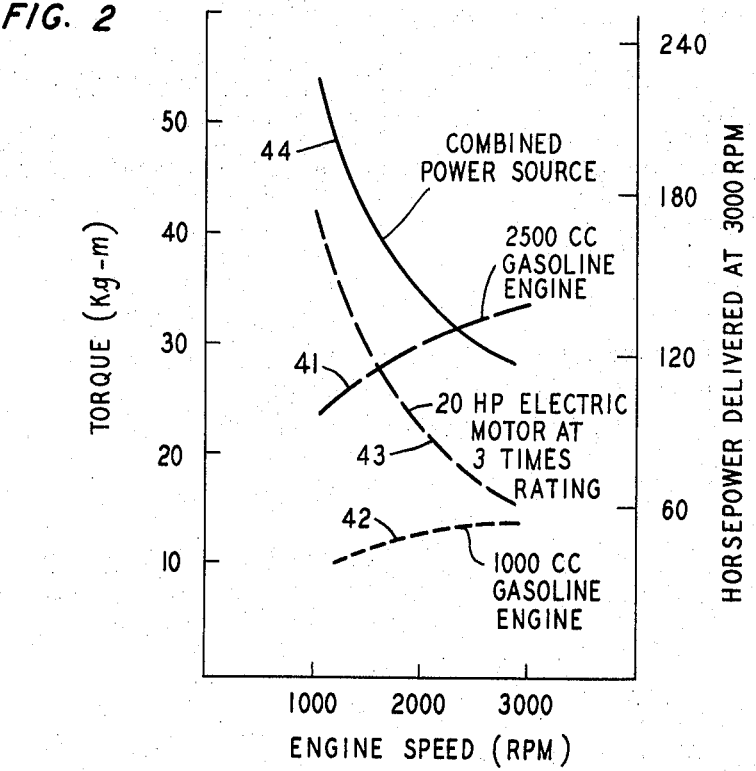
FIG. 2 is a set of curves of torque (ordinate) vs. engine speed (abscissa) for exemplary power sources.

In FIG. 2, curves 41 and 42 show typical torque responses of rotary type gasoline engines at fixed throttle setting for various engine speeds. Corresponding curves for typical piston engines show similar variation of torque with engine speed.

Though perhaps deviating from optimum combustion, there are mechanical controls, internal to the engine, which can vary engine parameters, such as the spark advance and the fuel intake control, so as to maintain nearly optimum combustion conditions over a wide range of engine speeds. These internal controls are operated by such speed and load dependent parameters as the engine speed and the pressure in the intake manifold. However, it is difficult to maintain optimum combustion in the face of large and rapid variations of the throttle settings. As has been mentioned above, large and rapid changes of the throttle settings cause unwanted changes in fuel-air mixture. Yet, it is possible to operate an internal combustion engine efficiently and with low levels of pollutant emissions at any one engine throttle setting, and consequently at one engine torque value, over a wide range of engine speeds, as well as over a slowly varying range of torque values. This is the operation we denominate, here, as quasi-constant-torque operation. An override mechanism can be provided, in order to convert the prime mover to more conventional operation, to accommodate extraordinary power requirements.

Another advantage to be realized is that the use of an engine operating under quasi-constant torque conditions produces an exhaust gas volume that is directly proportional to engine speed. This can enhance the efficacy of exhaust treatment devices that are used. For example, the efficacy of an exhaust manifold thermal reactor is a function of the fraction of air injected into the reactor. In the instant invention, if the air injection system is driven with a pump that is directly connected to the engine, it will automatically give the correct amount of secondary air. In a vehicle power plant that contains only an internal combustion engine, a compromise secondary air injection rate must be selected, or the air injection rate must be related to manifold pressure as well as to engine speed, since the mass of exhaust gas flowing through the reactor is dependent upon the product of manifold pressure and engine speed.

Secondary Electromechanical System

In the system disclosed herein, the secondary electromechanical system is connected to the output shaft of the heat engine by a fixed ratio (e.g., unitary) linkage. The secondary electromechanical system is designed to add or subtract from the torque output of the engine in accordance with the instantaneous needs of the vehicle being driven. The vehicle's instantaneous power needs are signaled to the power train by the operator of the vehicle via the accelerator control. The electromechanical device in the secondary system is designed to take energy from the storage battery during periods of greater-than-average torque requirements, while the secondary system is adding to the engine torque, and to replace that energy during periods of less-than-average torque requirements, while the secondary system is subtracting from the engine torque.

One class of electromechanical device is of interest for use in conjunction with the internal combustion engine. That device will be treated as exemplary here and all further discussion will be in terms of that device. The device can be called a dynamotor. It is a shunt wound electric motor which can be instantaneously controlled to vary both the magnitude and the sense of the torque applied to its output shaft by techniques well known in the electric motor art. For example, the field current of the shunt wound motor can be controlled by the accelerator pedal, so that the motor acts as either a generator or a motor, depending on the pedal position.

The use of such dc motors is also advantageous because of their favorable overload characteristics. Such motors can be operated at three or more times their continuous rating for the short periods of time typical of most acceleration events [A. Kusko, Solid State DC Motor Drives, M.I.T. Press (1969)] Kusko gives the following estimates or overload capabilities of dc motors:

| % of Rated Current | Duration (sec) | Repeat time (less than) |
|---|---|---|
| 800 | ½ | 1 per minute |
| 550 | 5 | 1 per 5 minutes |
| 350 | 60 | 1 per 20 minutes |

When the motor torque is in the same sense as the engine torque, the torques add and the torque applied to the tractive load of the vehicle is increased (the engine rotation is always in the same sense as the engine torque; vehicle direction reversal is externally accomplished in the vehicle transmission). This requires electrical energy, which is abstracted from the storage battery. When the motor controller causes the sense of the torque to reverse in response to a decreased demand from the accelerator, the motor torque subtracts from the quasi-constant engine torque, and a decreased torque is applied to the tractive load of the vehicle. In this state the motor is abstracting energy from the engine and recharging the battery. Electric motors which can be controlled in this fashion and methods of controlling them are well known in the art. In view of the above planned intermittant dynamotor useage, operation at three times rated load is a conservative design choice for average urban driving.

Power Train Operation

Figure 1:
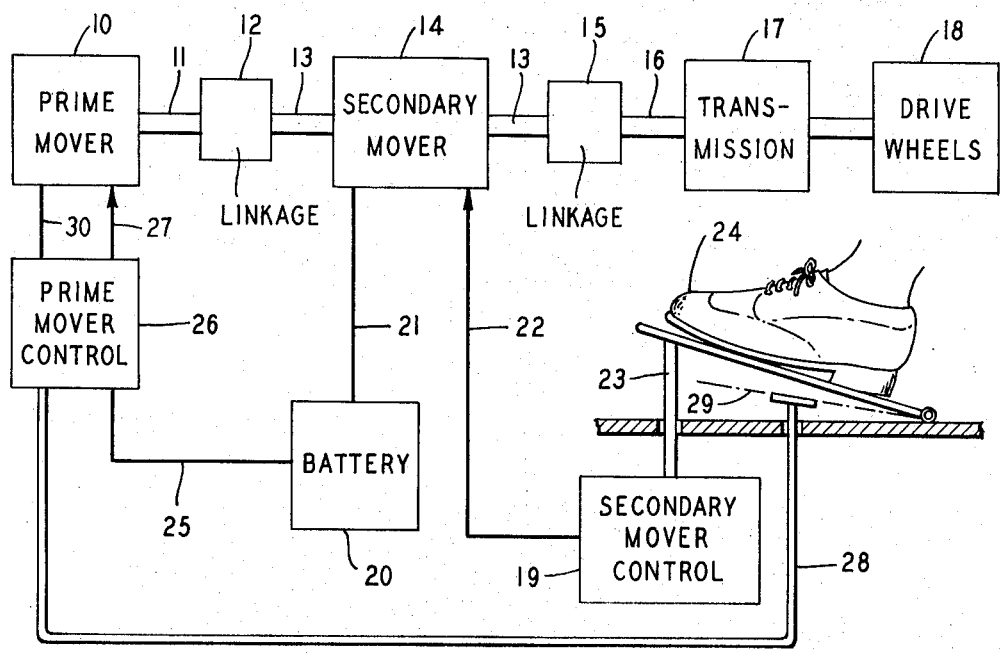
FIG. 1 is a schematic view of an exemplary hybrid power train, constructed in accordance with the invention.

FIG. 1 shows, schematically, an exemplary hybrid power train constructed in accordance with the invention. The prime mover 10 is connected by a rotating shaft 11 and a fixed ratio linkage 12 to the shaft 13 of the secondary electromechanical device 14. The shaft 13 is, in turn, connected by a fixed ratio linkage 15 to the vehicle drive shaft 16. In the simplest case, the fixed ratio linkages 12, 15 are all of unit ratio, there being but a single common shaft. The mechanical energy produced by the prime mover 10 and the secondary electromechanical device 14 is transmitted to the propulsion mechanism 18 of the vehicle through a transmission 17 of standard construction and function.

An exemplary vehicle for which this power train is proposed is the automobile. Therein the prime mover 10 is an internal combustion engine. The fixed ratio linkage may be, for example, a solid axle and universal joint, or a pair of gears or other gear train. The secondary electromechanical device 14 can be a dynamotor which is capable, upon command from the secondary control 19, of taking energy from the storage battery 20 via the electrical conductor 21 and transmitting it to the drive shaft 13. Alternatively, upon command it can take energy from the engine 10 and recharge the battery 20. The command is transmitted to the motor 14 by the secondary mover command lead 22. The vehicle's torque requirements are usually signalled to the secondary control 19 by mechanical control 23 activated by the operator 24 of the vehicle. In the automobile this mechanical control 23 is usually called the accelerator pedal. In some alternate arrangements for vehicles designed to meet other requirements (e.g., constant speed operation) the vehicle's torque requirements can be signalled by some sensor (e.g., a speed governor) either mechanically or electrically.

The above described power train will operate at quasi-constant torque for extended periods, with replenishment of the fuel supply, so long as the average tractive power requirement is equal to the average power output of the engine. If the tractive energy demand is greater than the energy supplied by the engine, the battery will eventually be reduced to discharged state. At that point, it is necessary to recharge the batteries from an external source of electrical energy.

In another operating mode of the power train, it is possible to prevent the occurrence of the discharge state by slowly increasing the average power output of the engine. This is most conveniently accomplished by providing a sensor in the battery 20, which provides an output signal to lead 25 dependent upon the state of charge of the battery 20. This sensor may detect such things as the battery voltage, specific gravity of the battery fluid or other battery parameters. The sensor signal goes to a prime mover control 26 which sends appropriate control signals over control lead 27 to the prime mover 10. These control signals slowly change the throttle setting to increase or decrease the torque output of the engine and effect quasi-constant torque operation of the engine.

It may also be desirable, from the point of view of improved mechanical performance or decreased pollutant emission, to control the throttle setting dependent on the rotational velocity of the prime mover 10. Since the rate of change of the rotational velocity of the prime mover 10 is slow compared to typical accelerator 23 variations, such control is within the meaning of quasi-constant-torque operation. Vehicle speed dependent control can, for instance, be used to reduce the prime mover output for vehicle velocities at which the prime mover 10 produces undesirably higher levels of pollutant emission. In order to accomplish such control a vehicle speed dependent output signal can be transmitted to the prime mover control 26 over lead 30.

The maximum torque capability of the instant power train is determined by the maximum power train capability of the secondary energy source 20 (the batteries) and the maximum electrical power input capability of the motor. The size requirements for the motor and batteries can be held constant while increasing the maximum torque capability of the power train, if the prime mover 10 can be used to supply some of the peak torque during intervals of extraordinary torque demand. Since the intent of the instant invention is to reduce automobile pollution during stop-and-go urban driving by minimizing engine throttle variations, it is important not to activate the throttle during as much of a driving mission as possible. This can be accomplished by having the engine increase its power to aid peak torque requirements only above a certain predetermined torque setting. This can be accomplished, for example, as shown in FIG. 1, by having a mechanical linkage 28 to the prime mover control (e.g., engine throttle) that is engaged only after the accelerator pedal 23 reaches a certain predetermined angle of travel 29. Thus, during ordinary operation, including moderate peak torque demands, the engine throttle is operated in a fixed position leading to low pollution operation, yet the power train is capable of supplying additional torque by opening the throttle for extraordinary situations.

While the secondary electromechanical system has, thus far, been described in terms of a single dynamotor, its motor and generator functions can be separated or shared by two or more devices. The simplicity of construction, in that case, is preserved by providing a fixed ratio mechanical linkage between the devices.

An override device can be included on the mechanical brake of the automotive vehicle such that a linkage assures closing of the engine throttle when the brake is depressed very rapidly (or with great pressure) in order to assure maximum braking capability during emergency stopping requirements.

EXAMPLES

FIG. 2 shows some of the operational characteristics of a hybrid power train of the inventive type. The power train incorporates a 1 liter (70 cubic inch) displacement gasoline engine of the rotary type together with a shunt wound dc motor rated at 20 horsepower. Curve 42 shows the torque delivered by the engine, operating at constant throttle, as a function of engine speed. At 3,000 RPM the engine is delivering nearly 60 horsepower. Curve 43 shows the torque delivered by the motor operating at three times its rated current. (Intermittant operation at this level of overload is permissable, as described above.) The sum of curves 42 and 43 is shown as curve 44, the hybrid power train characteristic curve.

The output characteristics 44 of this hybrid power train can be compared to the output characteristics of a 2.5 liter rotary engine which is shown as curve 41. Comparison of curves 41 and 44 shows that the low speed intermittant torque capabilities of the hybrid power train far exceed the low speed torque capabilities of the much heavier 2.5 liter engine, and that this superiority is maintained to an engine speed of more than 2,000 RPM.

The combustion engine used for the hybrid can be designed to reduce the output of undesirable emissions by utilizing various techniques that are well known to those versed in the art. For example, the use of air/fuel ratio of 16/1, recirculating 15 percent of the exhaust gas to the fuel induction system, and retarding the ignition spark of 10 degrees MBT (maximum advance for best torque) has been shown to reduce the oxides of nitrogen, and carbon monoxide, in the engine's exhaust by 90 percent when compared to an engine operating with an air/fuel ratio of 14/1 without exhaust gas recirculation, and without spark retardation. However, the power per unit weight of the engine operating under the aforementioned low emission conditions is reduced almost in half. In the hybrid taught by the instant invention, only the power per unit weight of the engine is reduced, rather than the power per unit weight of the entire power plant, so that the combustion engine can be adjusted to operate in a low pollution manner, even though this entails a reduction in specific engine power, without decreasing instantaneous power available at the wheels.

I claim:

1. A parallel, low-pollution, hybrid power train for a self-propelled vehicle comprising
   a. A prime mover consuming a chemical fuel to produce mechanical energy, said prime mover being an internal combustion engine normally operated at a constant throttle setting during normal driving conditions;
   b. An electromechanical secondary mover connected by a rotating interconnection shaft including a fixed ratio mechanical interconnection linkage to the prime mover;
   c. An output shaft connected by a fixed ratio mechanical output linkage to the interconnection shaft;
   d. An accumulator for electrical energy, electrically connected to the secondary mover by an electrical power linkage;
   e. A secondary control electrically connected by a secondary control linkage to the secondary mover so as to control the magnitude and direction of the flow of electrical power through the electrical power linkage; and
   f. An accelerator means connected to the secondary control and for governing the operation thereof in accordance with the torque requirement of the vehicle during normal driving conditions.

2. A power train of claim 1 including a prime control connected to the prime mover and the accumulator so as to control the torque applied by the prime mover to the interconnection shaft in accordance with the state of the under-accumulation and over-accumulation of the accumulator.

3. A power train of claim 2 including a mechanical linkage to the prime mover so as to increase its throttle setting for increasing the torque applied by the prime mover to the interconnection shaft in accordance with the torque requirements of the vehicle in excess of a predetermined torque value as determined by said accelerator means.

4. A power train of claim 1 in which the secondary mover is a dynamotor and the accumulator is a storage battery.

5. A power train of claim 1 including a thermal reactor through which exhaust gas passes in order to reduce the level of pollutants.

6. A power train of claim 1 in which the interconnection shaft, the interconnection linkage, the output shaft and the output linkage form a unitary drive shaft.

7. A power train of claim 1 in which the interconnection linkage is a fixed ratio interconnection gear train.

8. A power train of claim 1 in which the output linkage includes a fixed ratio output gear train.

9. A power train of claim 1 including a mechanical linkage to the prime mover so as to increase its throttle setting for increasing the torque applied by the prime mover to the interconnection shaft in accordance with the torque requirements of the vehicle in excess of a predetermined torque value as determined by said accelerator means.

* * * * *